April 9, 1957  E. T. JOHNSON  2,787,879
TRACTOR MOUNTED RECIPROCATING MOWING ASSEMBLY MOUNTING MEANS
Filed April 18, 1955  4 Sheets-Sheet 1

INVENTOR.
E. T. JOHNSON

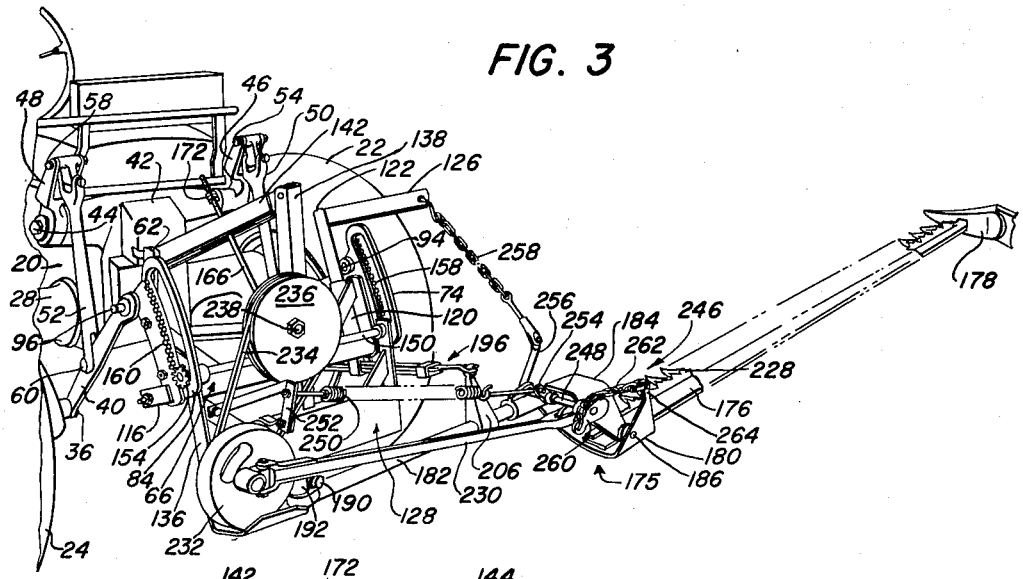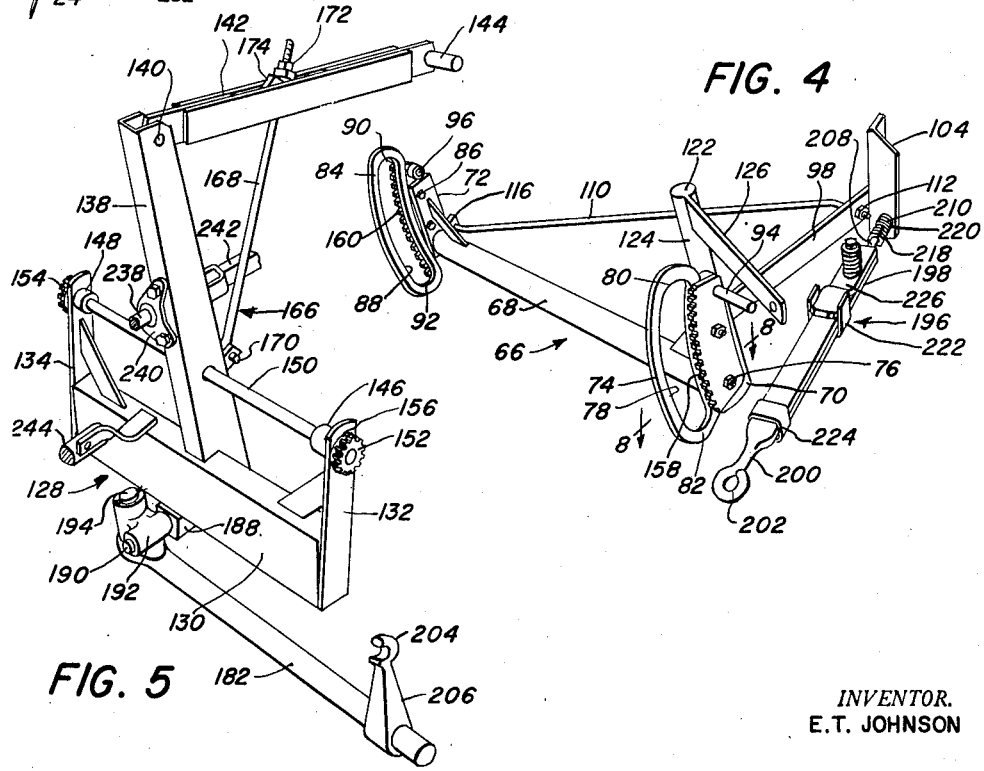

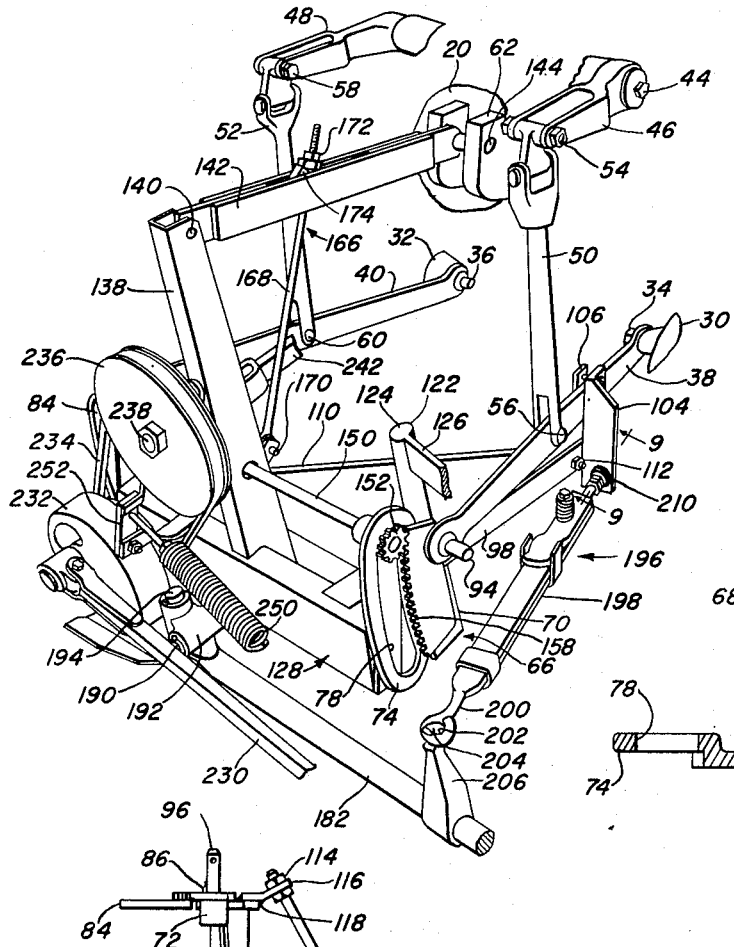
FIG. 6
FIG. 8
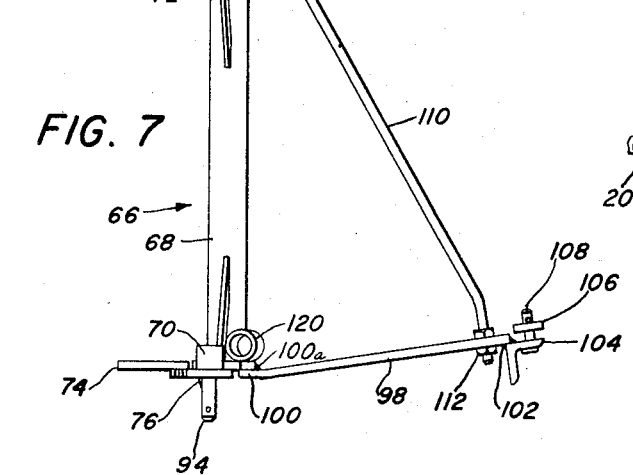
FIG. 7
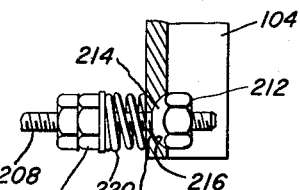
FIG. 9
INVENTOR.
E. T. JOHNSON

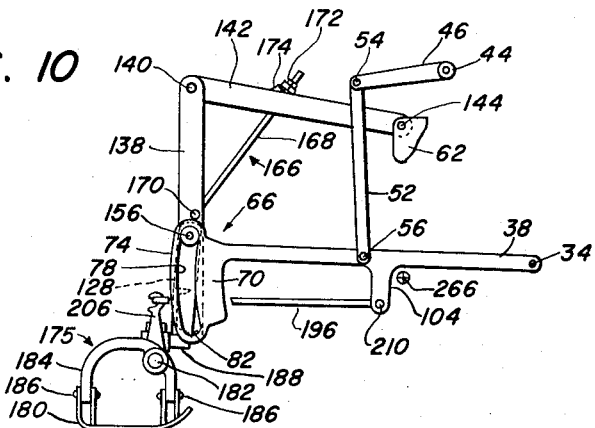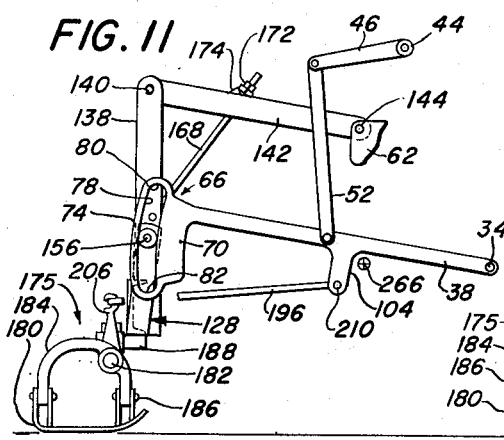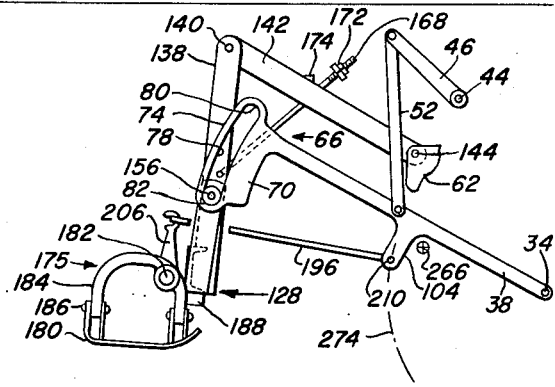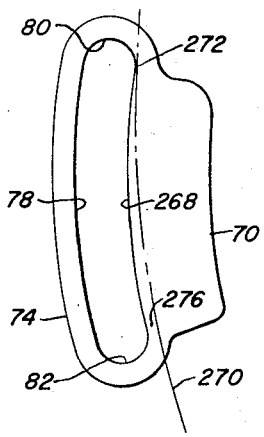

United States Patent Office 2,787,879
Patented Apr. 9, 1957

2,787,879

TRACTOR MOUNTED RECIPROCATING MOWING ASSEMBLY MOUNTING MEANS

Ellsworth T. Johnson, Moline, Ill., assignor to Deere & Company, Moline, Ill., a corporation of Illinois Application April 18, 1955, Serial No. 501,765

29 Claims. (Cl. 56—25)

This invention relates to an agricultural implement and more particularly to a tractor-mounted or tractor-connected implement. More especially the invention relates to a mower attachment for a tractor.

A mower attachment directly mounted on the rear of a tractor has many advantages over mowers otherwise mounted or connected. In the past, a typical agricultural tractor would include rigid thereon a drawbar that afforded support for the mower and various forms of lift devices were adapted for mounting either on the drawbar or on the tractor for adjusting the cutting mechanism of the mower. More recently, however, agricultural tractors are equipped with hitches of the so-called three-point type. Such hitch normally includes a pair of lower rearwardly extending draft links, articulately connected at their forward ends for vertical swinging between raised and lowered positions. A power lift device integral with or mounted on the tractor is connected by lift links to these arms and is hydraulically controlled to raise and lower the arms. The rear ends of the draft links provide a pair of hitch points, and a third hitch point is provided by an anchor member mounted on the tractor at a level above the draft link pivots. In the use of a three-point hitch tractor with a tillage tool, the third hitch point is connected to means for controlling the hydraulic valve of the power lift device and the draft load on the implement would determine the lowered position of the draft links. However, in the adaptation of the three-point hitch to a mower or similar harvester, or other implement in which there is no appreciable draft load, some other means must be provided for determining the lowered position of the draft links; otherwise, the power lift device would allow the draft links to lower to their mechanical limits. In most cases, the lower limit is too low for efficient operation, primarily because the mounting of the draft links bears a certain relationship to the power take-off of the tractor and an excess of vertical range between raised and lowered positions would impose impossible angles on the power shafting connected to the link-mounted mower or other implement. It is therefore one of the important objects of the present invention to provide improved means for controlling the range of movement of the draft links, whereby the mower or other implement operates selectively in raised or lowered positions in which the power take-off shaft does not assume extreme angles.

Another difference between the older mowers that are mounted rigidly on a rigid drawbar and the later style mowers that are mounted on draft links is that in the former case the power lift device is independent of the drawbar and can be connected directly to the mower to raise and lower the mower. In the three-point hitch tractor, it is desirable to use the power lift device as already connected to the links, without disconnecting the power lift device and connecting it directly to the mower. It is therefore another important object of the present invention to utilize the basic power lift device and its association with the draft links for adjusting the vertical position of the mower. This aspect of the invention features the utilization of vertical lost-motion means in which a portion of the range of movement of the draft links is utilized to raise the cutter bar to a transport position and the remainder of the range is used to lift the entire mower. This is all accomplished without any modification of the tractor and all of the connecting and adjusting components are parts of the mower, whereby the mower may be provided as an attachment readily adapted to any tractor including the basic three-point hitch.

The invention further features equalizing means operating between laterally spaced elements to assure a level lift of the mower or other implement. Still another object of the invention resides in guide means for controlling the vertical movement of the implement or mower and this guide means is especially designed to assure the lowermost position of the links so as to afford the maximum range of lost motion.

General objects of the invention pertain to the provision of a novel and inexpensive type of mower attachment, including supporting and mower frame parts of simple and inexpensive construction.

The foregoing and other important objects and desirable features inherent in and encompassed by the invention will become apparent as a preferred embodiment of the invention is disclosed in detail in the ensuing description and accompanying sheets of drawings, the several figures of which are described immediately below.

Fig. 3 is a similar perspective view showing the cutter bar fully lifted to its field transport position.

Fig. 4 is an enlarged perspective view, from the other side of the machine, showing the supporting frame by itself.

Fig. 5 is an enlarged related perspective view showing the mower or implement frame by itself, portions of the structure being omitted in the interests of clarity.

Fig. 6 is a fragmentary perspective view showing the assembly of the frames of Figs. 4 and 5 and the relationship thereof to portions of the tractor.

Fig. 7 is a plan view of the supporting frame of Fig. 4, with portions thereof omitted.

Fig. 8 is a fragmentary sectional view, on an enlarged scale, as seen along the line 8—8 of Fig. 4.

Fig. 9 is a fragmentary sectional view, on an enlarged scale, as seen along the line 9—9 of Fig. 6.

Fig. 10 is a side elevational view, largely diagrammatic, showing the operating position of the mower and the relationship thereof to the draft and control links, illustrating the inner shoe in its ground-engaging position.

Fig. 11 is a similar view showing lifting of the supporting frame during the first part of the range of upward movement of the draft links.

Fig. 12 is a similar view showing a further stage of lifting.

Fig. 13 is a similar view showing the final stage of lifting.

Fig. 14 is a fragmentary schematic view, on an enlarged scale, showing the relationship between the design of the guide means and the arc about which the draft links swing.

Figure 1:
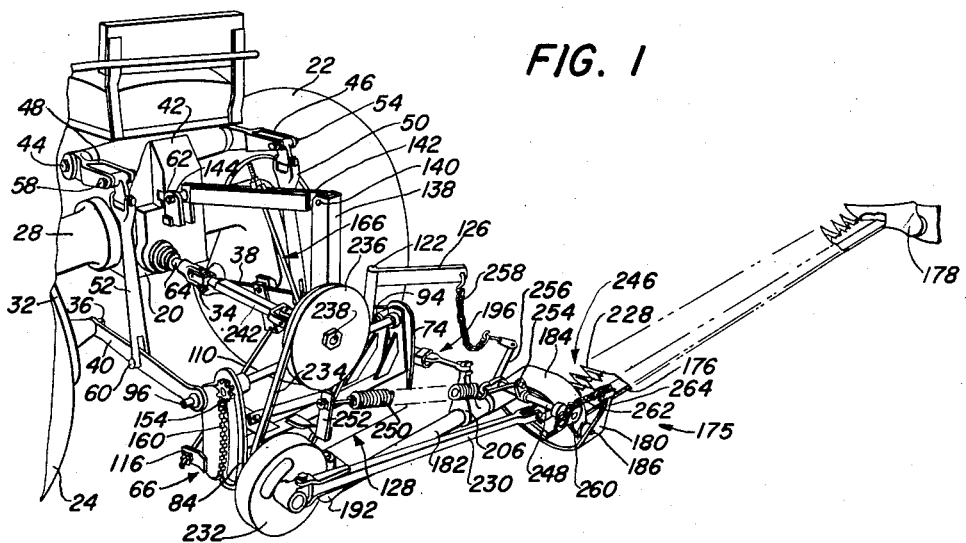
Fig. 1 is a perspective view of a mower as mounted on the rear portion of a tractor, the cutter bar of the mower being shown in its horizontal or operating position.

The tractor chosen for purposes of illustration is of a popular type and conventionally includes a longitudinal or fore-and-aft extending body 20 carried between right and left hand traction wheels 22 and 24 by means of right and left hand axle housings 26 and 28 that respectively include depending housing portions 30 and 32. Portions of the depending housings 30 and 32 provide a pair of lower coaxial pivots or articulate connections 34 and 36, respectively, for rearwardly extending draft links 38 and 40.

The tractor is integrally equipped with a power lift device, preferably hydraulic, as shown at 42. Power lift devices of the general character referred to are conventional in the prior art and faciliarity with the details thereof will be assumed. Such device normally includes, and includes here, a transverse rockshaft 44, to opposite ends of which are rigidly connected rearwardly extending right and left hand lift arms 46 and 48. These arms are connected respectively to the draft links 38 and 40 by right and left hand lift links 50 and 52. The connections of the lift links at opposite ends thereof to the draft links and to the lift arms are pivotal on at least transverse axes, as represented by the numerals 54 and 56 for the right hand link and 58 and 60 for the left hand link.

As will be brought out more clearly below, the rear ends of the draft links 38 and 40 provide a pair of hitch points or hitch members, and a third hitch point or upper hitch member 62 is afforded by what may be considered as an anchor on the tractor above the level of the transverse pivot axis provided by the draft link pivots 34 and 36. Such upper hitch member is conventionally part of a tractor having a so-called three-point hitch.

Another part of the basic tractor structure, conventionally provided as regular or optional equipment, is a rearwardly extending power take-off shaft 64, from which drive is transmitted to the implement or mower structure to be presently described.

The supporting part or frame is shown by itself in Figs. 4 and 7 and is identified in its entirety by the numeral 66. This part or frame comprises a transverse torsion bar or tube 68 to opposite ends of which are rigidly secured right and left hand mounting portions affording support arms or brackets 70 and 72. A right hand generally upright and preferably arcuate guide member 74 is rigidly secured to the bracket 70 as by bolts 76. The guide member has an upright arcuate slot 78 which defines a guide or track having upper and lower closed ends 80 and 82 that afford stops for a purpose to presently appear.

A left hand guide member 84 is similarly mounted relative to the left hand support arm or bracket 72, being secured thereto, as by bolts 86, and having an arcuate track or slot 88 defined at its upper and lower ends by closed stop portions 90 and 92.

Mounting of the support frame 66 on the draft links is accomplished by right and left hand rear trunnions or pintles 94 and 96, and these pintles are respectively received by the apertured rear ends of the draft links 38 and 40. The structure just described thus affords means for affixation of the frame 66 to the draft links for movement with the draft links between raised and lowered positions. An additional part of the affixation means comprises a forwardly extending brace 98, having its rear end 100 rigidly secured, as by welding at 100a (Fig. 7), to the right hand bracket 70. The forward end of the brace 98 is secured, as by welding at 102, to an upright angle 104 positioned so as to lie along the right hand face of the right hand draft link 38. An apertured strap 106 and a pair of connecting pins 108 serve to connect the angle 104 to the forward portion of the draft link 38, the draft link being sandwiched between the angle 104 and the strap 106. A diagonal brace 110 is secured at 112 to the front end of the brace 98 and is secured at its rear end at 114 to an apertured ear 116 rigidly fixed to the lefthand bracket 72, as by welding at 118. The frame 66 is thus a simple and inexpensive but rigid structure suitably designed for substantial universal attachment to all threepoint hitch tractors within a certain size and power range. As is well known, the draft links of a tractor having a hitch of the general character referred to are laterally swingable as well as being vertically movable and thus are capable of being spread apart to receive the trunnions or pintles 94. After the pintle connections are made and the connection at 104–106 effected, the diagonal brace 110 serves as a stabilizer to eliminate lateral sway of the draft links.

Rigidly secured to the inside face of the right hand bracket 70 is a substantially upright tube 120 that affords a pivot or socket for the mounting of a lift arm 122. The lift arm has a standard portion 124 that is pivotally received in the tube or socket 120, and further has a lift arm 126 for effecting a lift connection to the mower or implement as will be brought out in detail below.

The mower frame or implement part is shown by itself in Fig. 5 and is identified in its entirety by the numeral 128. This frame comprises a transverse frame part or channel 130 having mounting portions in the form of right and left hand upstanding brackets or supports 132 and 134 at its opposite ends, respectively. Rigidly secured to a mid-portion of the frame part 130 is an upright member or mast means 138, the upper end of which is connected by a transverse rear pivot 140 on a horizontal axis to the rear end of a fore-and-aft extending top or upper link 142. The forward end of the top link includes a transverse front pivot 144 by means of which a pivotal connection is made to the upper hitch member 62 on the tractor.

The supports or brackets 134 and 136 on the frame 128 respectively have bearings 146 and 148 which journal a cross shaft 150. The shaft passes through the mast 138 (Fig. 5). The shaft 150 carries at its right and left hand ends right and left hand track followers, here in the form of pinions 152 and 154, respectively. The right hand pinion 152 has a hub portion 156 which runs in the right hand guide slot or track 78. The pinion 152 constantly meshes with an arcuate toothed rack 158 formed as part of the right hand guide member 74. The front edge of the track 78 affords a bearing surface along which the pinion hub 156 runs so that the pinion and rack teeth are relieved of radial compression loads. The left hand pinion 154 includes a hub (not shown) similar to the hub 156 on the right hand pinion 152 and the left hand hub runs in the left hand arcuate guide or track 88, the left hand pinion 154 meshing with an arcuate toothed rack 160 formed as an integral part of the left hand guide 84.

Fig. 6 illustrates the assembly of the frames 66 and 128 of Figs. 4 and 5, respectively. In this figure (Fig. 6), it will be seen that the mower frame is carried on the supporting frame by the pair of laterally spaced means comprising the pinions 152 and 154 and the guide members 74 and 84, the pinion hubs being received respectively in the guide slots or tracks 78 and 88 and the pinions 152 and 154 meshing respectively with the racks 158 and 160. Since the pinions are rigidly interconnected by the cross shaft 150, an equalizing effect is secured, whereby the level of the frame 128 is maintained at all times even though the frame 128 is movable relative to the frame 66. Hence, the shaft and pinions, together with the racks, constitute equalizing means. Moreover, since there is relative vertical movement between the frames 66 and 128, the hubs of the pinions, running in the slots 78 and 88, constitute, together with the guides 74 and 84, vertical lost-motion means. Vertical movement of the frame 128 is stablized by means of the top link connection 142 between the upper hitch member 62 and the mast 138. Substantial fore-and-aft displacement between the frames 66 and 128 is prevented because of the cooperation between the components of the vertical lost-motion means which, as just described, includes the guide means 78—152 and 88—154.

Relative vertical movement between the frames 66 and 128 is limited to a range determined by the length of each of the arcuate slots 78 or 88, the opposite ends of which, already described at 80 and 82 and 90 and 92, constitute stops on the guide members 74 and 84. The hubs of the pinions constitute stops cooperative with the stops just referred to, whereby the frame 66 may be moved upwardly by the draft links and power lift arms 46 and 48 through a predetermined phase before engagement of the stops occurs to effect picking up of the mower frame 128. In other words, the range of vertical movement of the frame 66 is greater than that of the mower or implement frame 128, which will be apparent from the following brief description of Figs. 10 through 13.

Fig. 10 shows the parts in their lowered or operating positions, and it will be seen that the pinion hub 156 is at the upper end 80 of the guide slot or track 78. In the schematic illustration resorted to here, the draft link 38 and frame 66 have been shown as an integral component, since, in effect, the two are interconnected for movement together. When the power lift is actuated to rock the rockshaft 44 in a clockwise direction, the lift arm 46 moves upwardly, lifting the draft link 38 via the link 52. As the draft link swings upwardly about its pivot 34 to the tractor, it does so without material lifting effect on the mower or implement frame 128. Stated otherwise, the frame 66, moving upwardly with the draft link 38, leaves the mower frame 128 in its lowered or operating position. As the supporting frame 66 continues upwardly with the draft link 38, progressing through the positions of Figs. 11 and 12, the pinion hub 156 eventually bottoms at 82 in the track or slot 78, which constitutes an interengagement of stops comprised respectively by the parts 156 and 82. After bottoming of the pinion hub 156 in the lower end 82 of the slot 78, the stops constituted thereby are engaged so that when the frame 66 moves with the draft link 38 to the position of Fig. 13, the mower frame 128 is picked up bodily by the supporting frame 66, thereby raising the mower frame to its maximum raised position. As previously stated, vertical movement of the mower frame is stabilized or controlled by the top link 142 and its connection between the upper hitch member 62 and the mower frame mast 138.

Downward movement of the frames 66 and 128 is effected by limit means 166. This means comprises a link 168 pivotally connected at its lower end at 170 to an intermediate portion of the mast 138 and passing between the two portions that comprise the top link 142. At its upper end, the link 168 carries an adjustable stop 172 engageable with a lug 174 welded to the top link 142. The limit means 166 is effective in one direction (downward only) to limit downward movement of the frames 66 and 128. The limiting effect is accomplished by engagement of the stop 172 with the lug 174, thus preventing relative pivoting between the top link 142 and mast 138 about the pivot 140. When the limit means 166 is engaged or locked, further downward pivoting of the mower frame must be about the point 144, meaning that the mower frame tends to move downwardly and forwardly. However, the downward and forward movement is opposed by the front edges of the guide members 74 and 84, the pinion hubs running against these edges and placing the draft links 38 and 40 in compression. Further details of the action involved in raising and lowering of the frames 66 and 128 will be included in connection with the description of cutting mechanism 175 carried by the mower frame 128.

The cutting mechanism 175 comprises a cutter bar 176 having an outer shoe 178 and an inner shoe 180, together with a drag bar or support 182 and a connection in the form of a yoke 184 that interconnects the drag bar and cutter bar. The connection between the yoke 184 and the cutter bar 176 includes longitudinally spaced apart coaxial pivots 186 that establish a pivot axis for hinging the cutter bar to the drag bar.

A bearing block 188 on the mower frame 128 affords a fore-and-aft pivot 190 on which is mounted a bearing 192 that includes a pivot on an upright axis at 194. The pin that constitutes the pivot 194 is fixed to the inner end of the drag bar 182, whereby the drag bar may have both vertical and horizontal movement relative to the mower frame 130. The cutter bar, of course, has vertical movement relative to the drag bar about the pivot axis through the pivots 186.

In its normal operating position, the cutting mechanism 175 extends laterally to the right (Fig. 1) and is releasably retained in that position by releasable break-back means shown best in Figs. 4 and 6 and identified in its entirety by the numeral 196. This means comprises front and rear bars 198 and 200, respectively, and the rear bar has an eye 202 for hooking onto the hooked upper end 204 of an arm 206 rigid on an outer end portion of the drag bar 182. The front bar 198 includes integral therewith a forward extension in the form of a threaded rod 208 which is pivotally received by the aforementioned bracket 104 to establish a pivot at 210 (Fig. 9). This pivot is effected by a nut 212 threaded on the rod 208 and having a partly spherical rear portion 214 that seats in a socket 216 in the angle 104. A pair of lock nuts 218 and a spring 220 complete the pivot at 210 in an obvious manner.

The break-back bars 198 and 200 are telescopically interconnected for extension and retraction by front and rear clips 222 and 224, and the bars are held in their retracted position by a spring-loaded latch 226. When the cutting mechanism encounters an obstacle of sufficient magnitude, the latch 226 releases and allows the bars to extend, the rear bar moving rearwardly relative to the front bar and permitting the cutter bar to swing rearwardly about the vertical pivot 194. This is a conventional function and the break-back means 196 is but one of many types of break-back means that could be used. The structure per se forms no part of the present invention, except as an element of the combination including the over-all structure. The articulate connection at 202—204, as well as the pivot 210, permits free floating movement of the cutting mechanism as varying ground contour is encountered, the cutting mechanism swinging about the horizontal pivot 190 as a whole or the cutter bar 176 pivoting about the horizontal pivot at 186 relative to the drag bar 182.

The cutting mechanism includes a conventional knife 228 mounted in any suitable manner in the cutter bar 176. This knife is driven by a pitman 230 and a flywheel 232. Belt drive at 234 is effected from a driving sheave 236 keyed to the rear end of a driving shaft 238. This shaft is carried in any suitable bearing, as at 240, on the mast 138, and is connected by a propeller shaft 242 to the tractor power take-off shaft 64. There is visible at 244 in Fig. 5 a shaft for mounting of the flywheel 232.

Forcible raising of the cutter bar 176 relative to the drag bar 182 and yoke 184 about the fore-and-aft pivot at 186 is effected by lifting mechanism 246. This mechanism may be of any conventional construction. That shown includes a fore-and-aft rockshaft 248 appropriately journaled by the yoke 184. A counterbalance spring 250 is connected at one end at 252 to the mower frame 128 and is connected at its other end to an arm 254 rigid on the rockshaft 248. The action of the spring tends to rock the rockshaft 248 in a counterclockwise direction, as viewed in Figs. 1, 2 and 3, thus exerting a lifting effect on the cutter bar 176, causing the cutter bar to raise relative to the drag bar 182 about the fore-and-aft pivot 186. However, as is well known to those versed in the art, the weight of the cutter bar is such that it is substantially balanced in a horizontal operating position.

The rockshaft 248 has rigidly secured to its front end an upstanding arm 256, and a lift connection in the form of a chain 258 is connected between the arm 256 and the lift arm 126 on the lift member 122 previously described. An arm 260, rigid on the rear end of the rockshaft 248, is connected by a chain 262 to an arm 264 that is integral with the inner shoe 180. The arrangement is such that counterclockwise rocking of the rockshaft 248 tightens the chain 262 and exerts a force on the shoe arm 264, resulting in raising of the cutter bar 176 relative to the yoke 184, this raising action being assisted, as previously described, by the counterbalance or assist spring 250. When the cutter bar "breaks" back, as upon encountering an obstruction to forward travel it swings about the first vertical pivot at 194 and the chain 258 causes the lift arm 126 to swing about the second vertical pivot at 124, thus eliminating the need for a releasable connection between the chain 258 and the arm 126.

When the mower is in its normal operating position (Fig. 1), the pinions 152 and 154 are at the tops of their respective tracks or guides 78 and 88 (Fig. 10). This means that both the inner and outer shoes 180 and 178 of the cutter bar 176 will be riding the ground. The lift chain 258 will be slack (Fig. 1), whereby there is a limited amount of floating movement of the cutter bar in the event that variations in ground contour are encountered. As previously described, the downward limit on the structure is established by the depth stop or limit means 166.

When it is desired to raise the cutter bar 176 slightly, as for transporting the machine from one part of the field to another, the power lift is operated to raise the draft links 38 and 40, which, in effect, amounts to raising of the supporting frame 66. The weight of the mower frame, drag bar 182 and yoke 184 will be sufficient to cause the mower to tend to remain in its operating position. Hence, the supporting frame 66 will begin to move upwardly relative to the mower (Fig. 11). As it does so, it first tightens the chain 258 and, as the frame 66 moves upwardly to the position of Fig. 12, lifting force is exerted through the means 246 to raise the outer end of the cutter bar 176. Because of the difference in moment arms effected when the rockshaft 248 reaches the position of Fig. 2, there will be a slight lifting effect on the inner shoe 180, the drag bar 182 pivoting about its horizontal pivot 190 to the mower frame 128. At this time, the pinions 152 and 154 will be at the bottoms of their respective guide slots or tracks 78 and 88. This is represented by bottoming of the right hand pinion hub 156 in the bottom of the slot, as shown in Fig. 12. In transporting the mower from one part of the field to the other, the amount of lift just described is normally sufficient to enable the cutter bar to clear cut and standing crops. In the event that a higher lift is required, the power lift device may be again operated to raise the draft links. At this time, the draft links raise both the frames 66 and 128, because the frame 66 picks up the mower frame 128 because of the engagement between the stops comprised by the cooperating parts of the tracks 78 and 88 and track followers 152 and 154. Thereupon, the mower frame is lifted bodily and the inner shoe assumes the position of Figs. 3 and 13, the outer shoe 178 continuing, of course, to rise as the entire cutting mechanism moves upwardly. As shown in Figs. 3 and 13, the stop 172 on the depth stop or limit means 166 separates from the top link lug 174.

For road transport, the cutter bar may be moved to an upright position about the hinge point 186, all of which is conventional and need not be illustrated or described here.

Figure 2:
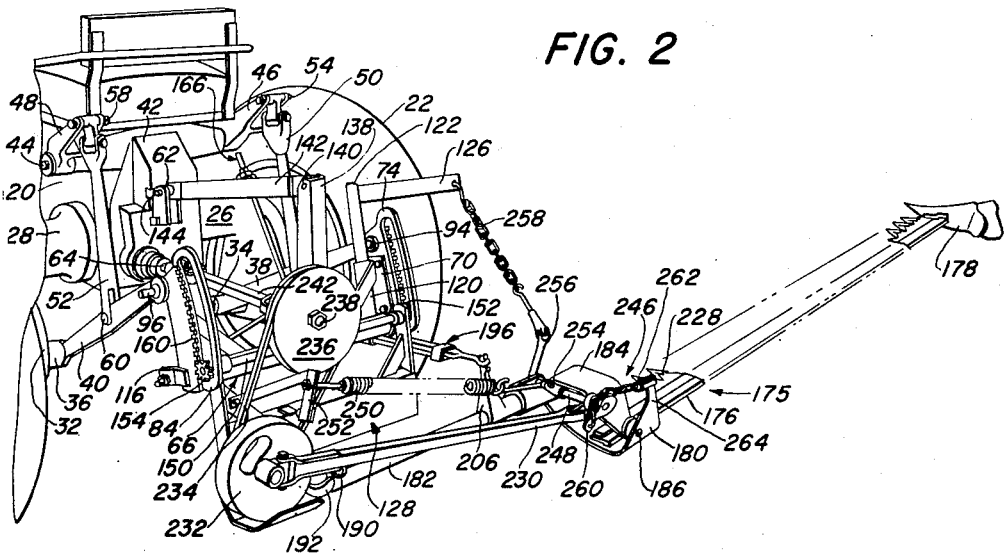
Fig. 2 is a perspective view similar to Fig. 1 but showing the cutter bar partly lifted.

Basically, what is involved is the utilization of the lost motion between the frames 66 and 128 to effect lifting of the cutter bar from the position of Fig. 1 to the position of Fig. 2. Also involved is the relatively low location of the mower, which enables the use of a flatter drive between the tractor power take-off shaft 64 and the mower drive shaft 238. That is to say, the cutter bar may be raised from the position of Fig. 1 to the position of Fig. 2 without any material alteration in the position of the propeller shaft 242. Hence, the knife may be left operating while the cutter bar is raised. Even when the cutter bar is raised to the position of Fig. 3, the angle of the propeller shaft is not extreme and the drive may continue to operate.

One of the important features of the invention is the design of each of the tracks 78 and 88. For purposes of clarification and ready reference, only the right hand track 78 will be described in connection with Figs. 10 through 14. As shown best in Figs. 10 through 13, the draft link 38 and associated supporting frame 66 are pivoted for vertical swinging about the transverse axis at the draft link pivot 34. However, the arc of the track 78 is not formed about the pivot 34 but is formed about an additional pivot 266. As seen, this pivot is eccentric to the pivot 34, being located rearwardly and below the pivot 34 in Fig. 10. The arc on which the track 78 is formed is therefore of smaller radius than the arc of swinging of the structure 38—66. In Fig. 14, the arc of the track is designated by the numeral 268. An arc 270 is drawn about the draft link pivot 34 and touches the arc 268 at the upper portion thereof, at a point designated by the numeral 272. Thus, the arcs 268 and 270 diverge downwardly, which is the result of the eccentricity of the pivot points 34 and 266.

The foregoing is important in connection with the function of the limit means or depth stop 166. As previously described, when the machine is in the positions of Figs. 10, 11 and 12, the limit means 166 is effective to nullify the pivot 140 between the top link 142 and mast 138. That is to say, the mast 138 cannot pivot relative to the link 142 in a rearward and downward direction. Hence, the inverted L formed thus by the top link 142 and mast 138 pivots as a unit about the front pivot 144 of the top link 142 to the upper hitch member 62. This tends to cause the mower frame and associated track followers (pinion hubs) to move forwardly. As seen in Fig. 12, the tendency of the parts to move forwardly as just described is resisted by the track 78, since the link 38 is in compression. Therefore, and since the limit means 166 is effective only to limit downward and rearward swinging of the mast 138 relative to the top link 142, the track followers will tend to climb the tracks 78 and 88. However, the weight of the mower frame actually prevents such climbing and since the draft links 38 and 40 are not fixed in the position of Fig. 12, the track followers, instead of climbing the tracks, will pull the tracks downwardly, thus, in effect, forcibly moving the tracks and associated draft links from the position of Fig. 12 to the position of Fig. 10. This assures slack in the lift chain 258 and furthermore assures the maximum range of relative vertical movement between the frames 66 and 128 in the lifting phase of the operation.

In the respect just described, the pinion and rack arrangement has no effect, other than leveling, on the "sucking" down of the draft links. The same result would obtain without the pinion and rack. In brief, the shape of the track is such that the force exerted by downward movement of the mower frame or implement part about the pivot 144 has a component effective to move the supporting frame and associated draft links downwardly so as to separate the stops constituted by the hubs on the pinions and the associated bottom ends 82 and 92 of the tracks 78 and 88, thus preventing the supporting frame from hanging in the positions of Figs. 10 and 11, for example.

In Figs. 10 through 13, the angle bracket 104 is illustrated as a component part of the draft link 38 and the pivot 210 is represented as a simple pivot. For all practical purposes, the construction could be as illustrated. However, it should be borne in mind that these illustrations are largely diagrammatic and are included expressly for the purpose of clarifying the action of the raising and lowering movements of the parts. Since the pivot 210 is effected on the draft link 38, it will move when the draft link moves, thus traveling in an arc 274 (Fig. 13). Since the pivot 210 thus moves rearwardly as it travels from the position of Fig. 10 to the position of Fig. 13, it would be expected that the break-back means 196, being fixed against shortening beyond its normal length, would force the cutting mechanism to swing rearwardly about the pivot 194. However, as the structure 66 is carried upwardly with the draft link 38, the mower frame is shifted rearwardly, because of the divergence or offset at 276 between the arcs 268 and 270. The rearward shifting of the mower frame as such causes rearward shifting of the pivot 194 so that although the cutting mechanism will be displaced rearwardly, it will do so in a straight-line fashion, thus avoiding undue angularity that would detract from the appearance of the machine in field transport position.

The invention thus disclosed here has many important features in connection with mowers in particular and allied implements in general. The relative vertical lost motion between the supporting and mower frames 66 and 128 is utilized to effect hinging of the cutter bar 176. The equalizing means comprising the shaft 150 and associated pinions 152 and 154 keeps the mower frame level during its range of vertical movement. The forces developed during downward movement of the mower frame tend to "suck" the draft links and mower frame 66 downwardly so that full advantage of the lost motion may be taken. Various other features not categorically enumerated herein will undoubtedly occur to those versed in the art, as will many modifications and alterations in the preferred embodiment of the invention illustrated, all of which may be achieved without departing from the spirit and scope of the invention.

What is claimed is:

1. A mower attachment for a tractor having vertically movable draft structure, comprising: a supporting frame having means thereon for affixation to the draft structure to move vertically therewith, said frame having spaced apart guide members thereon and each guide member having a generally upright guide slot therein, each guide member being closed at its upper and lower ends to respectively afford upper and lower stops; a generally horizontal mower frame including an element having opposite ends received respectively in the guide slots and carried by the supporting frame for vertical movement relative to said supporting frame within the limits established by the upper and lower stops.

2. The invention defined in claim 1, including: equalizing means cooperative between the two frames for maintaining substantially horizontal parallelism of the mower frame with the ground.

3. The invention defined in claim 1, in which: each guide member has a toothed rack thereon along one upright edge of its slot; and the element is rotatably carried on the mower frame and has at each end a pinion meshing with the respective rack for maintaining susbtantially horizontal parallelism of the mower frame with the ground.

4. The invention defined in claim 1, including: cutting mechanism hingedly carried by the mower frame for vertical movement relative thereto; a lift member carried by the supporting frame; and a lift connection between the lift member and the cutting mechanism for lifting the cutting mechanism relative to the mower frame when the supporting frame moves upwardly relative to the mower frame.

5. The invention defined in claim 4, in which: the cutting mechanism is carried by the mower frame for horizontal swinging relative to said mower frame about an upright first pivot; and the lift member is carried by the supporting frame on an upright second pivot spaced laterally from the first pivot, said lift member including a lift arm projecting generally radially as respects said second pivot and the lift connection to the cutting mechanism is effected on said arm, whereby the lift member pivots relative to the supporting frame as the cutting mechanism swings horizontally.

6. The invention defined in claim 1, in which: the supporting frame comprises a horizontal torque tube; and the guide members are respectively rigidly secured to opposite ends of said tube.

7. The invention defined in claim 1, in which: the means for affixation of the suporting frame to the tractor draft structure comprises a pair of coaxial pintles, one secured to and projecting from each guide member.

8. The invention defined in claim 1, in which: the supporting frame includes a member having opposite end portions to which the guide members are respectively secured; a brace is secured to the supporting frame at one end portion of the member and extends generally normally to the member to a free end remote from said member; and a diagonal brace is connected to said free end of the brace and to the supporting frame at the other end of said member.

9. The invention defined in claim 8, in which: the mower frame hingedly carries cutting mechanism for horizontal swinging between operating and released positions; and overload release means is connected between the cutting mechanism and the brace independently of the tractor draft structure.

10. A mower attachment for a tractor having vertically movable draft structure, comprising: a supporting frame having means thereon for affixation to the draft structure to move vertically therewith, said frame including spaced apart mounting portions; a mower frame, including mounting portions spaced apart on the order of and respectively proximate to and paired with the supporting frame mounting portions; a pair of spaced apart means respectively interconnecting the paired mounting portions, each interconnecting means including a guide member secured to one mounting portion of the associated pair and provided with a generally upright guide slot closed at opposite ends to afford upper and lower stops and a follower member secured to the other mounting portion of the associated pair and running in said slot so that the mower frame has vertical movement relative to said supporting frame within the limits established by the limits established by the upper and lower stops.

11. The invention defined in claim 10, including: equalizing means cooperative between the two frames for maintaining substantially horizontal parallelism of the mower frame with the ground.

12. The invention defined in claim 10, in which: each guide member on one frame has a toothed rack thereon along one upright edge of its slot; and the follower members are interconnected by an element rotatably carried on the other frame, each follower member comprising a pinion meshing with the respective rack for maintaining substantially horizontal-parallelism of the mower frame with the ground.

13. A mower attachment for a tractor having vertically movable draft structure, comprising: a supporting frame including a rigid member having opposite ends, a pair of spaced apart upright end plates respectively rigid on said opposite ends, and a hitch pintle projecting from each end plate, said pintles being coaxial on a horizontal axis for connecting said supporting frame to the tractor draft structure, brace means connected to at least one end plate and having attachment means for affixation to the draft structure to hold the supporting frame against pivoting relative to said supporting frame about the pintles, and a guide member secured to each end plate and having a generally upright guide slot thereon, each guide member being closed at its upper and lower ends to respectively afford upper and lower stops; a generally horizontal mower frame including an element generally parallel to the rigid member and having opposite ends received respectively in the guide slots and carried by the supporting frame for vertical movement relative to said supporting frame within the limits established by the upper and lower stops.

14. The invention defined in claim 13, including: cutting mechanism carried by the mower frame for horizontal swinging between operating and released positions; and releasable means connected to the cutting mechanism and connected directly to the aforesaid attachment means independently of the tractor draft structure.

15. A mower supporting frame for a tractor having vertically movable draft structure, comprising: hitch means on and for affixation of the frame to the tractor draft structure; and spaced apart guide members on the frame, each having therein a generally upright slot, each guide member being closed at its upper and lower ends to respectively afford upper and lower stops.

16. The invention defined in claim 15, in which: each guide member has a toothed rack thereon along one upright edge of its slot.

17. The invention defined in claim 16, in which: each guide member has a bearing surface thereon paralleling its rack.

18. The invention defined in claim 15, in which: each guide slot is arcuate about a common horizontal axis.

19. The invention defined in claim 18, in which: each guide member has thereon an arcuate toothed rack concentric with and defining one arcuate edge of its slot.

20. A mower frame, comprising: a support having spaced apart opposite ends horizontally alined; bearings coaxially carried respectively at said ends on a horizontal axis; a shaft journaled in the bearings and having opposite ends; and a pair of pinions fixed respectively to the shaft ends.

21. The invention defined in claim 20, in which: the support includes a mast rising therefrom intermediate its ends; and the shaft extends through the mast.

22. A mower attachment for a tractor having spaced apart, vertically movable draft links, comprising: a supporting frame having spaced apart means for affixation to and for cross-connecting the draft links for haulage as well as for bodily vertical movement of said frame with the draft links; a mower frame adjacent to the supporting frame; vertical-lost-motion means interconnecting the two frames for forward travel together and enabling limited vertical bodily movement of the mower frame relative to the supporting frame, said vertical lost-motion means including stops engageable between the frames and providing for delayed lifting of the mower frame by the draft links and supporting frame so that the draft links in an initial range of raising lift only the supporting frame and in a continued range of raising pick up and lift the mower frame via said stops; cutting mechanism hinged to the mower frame for relative vertical swinging; and lift means connected between the supporting frame and cutting mechanism for swinging the cutting mechanism upwardly relative to the mower frame during the aforesaid initial range.

23. A mower attachment for a tractor having vertically movable draft structure, comprising: a mower frame adjacent to the draft structure; vertical lost-motion means interconnecting the draft structure and the mower frame for forward travel together and enabling limited vertical bodily movement of the mower frame relative to the draft structure, said vertical lost-motion means including stops engageable between the mower frame and draft structure and providing for delayed lifting of the mower frame by the draft structure so that the draft structure in an initial range of raising moves upwardly exclusively of the mower frame and in a continued range of raising picks up and lifts the mower frame via said stops; cutting mechanism hinged to the mower frame for relative vertical swinging; and lift means connected between the draft structure and cutting mechanism for swinging the cutting mechanism upwardly relative to the mower frame during the aforesaid initial range.

24. The invention defined in claim 23, in which: the vertical lost-motion means includes substantially upright guide means controlling the fore-and-aft relationship between the mower frame and the draft structure.

25. The invention defined in claim 23, in which: the mower frame includes a substantially level element having spaced apart portions; the vertical lost-motion means has similarly spaced elements cooperating with said portions; and equalizing means is cooperative between said elements and portions for maintaining the mower frame level as it is raised by the draft structure.

26. For a tractor having an upper hitch member and a rearwardly extending draft link pivoted at its front end to the tractor on a transverse pivot below the upper hitch member for vertical swinging: an implement attachment comprising a supporting part connected to the rear end of the draft link for haulage as well as for vertical swinging thereof by the draft link between raised and lowered positions; an implement part adjacent to the supporting part and having a mast rigid thereon in substantially rearward alinement with the upper hitch member; means connecting the implement part to the tractor for movement between raised and lowered positions, including a fore-and-aft top link having a transverse front pivot to the hitch member and a transverse rear pivot to the mast; one-way limit means disengaged when the implement part is in its raised position and engageable, upon a predetermined amount of downward movement of the implement part, to hold the mast against rearward swinging relative to the top link about the rear pivot so that further downward movement of the implement part will occur about the front pivot; vertical lost-motion means between the parts, including stops respectively on the parts and vertically separated when the parts are in their respective lowered positions and engageable upon movement of the supporting part by the draft link toward its raised position, whereby upward movement of the draft link first causes raising of the supporting part to the exclusion of the implement part and next causes raising of the parts in unison; and said vertical lost-motion means including a generally upright track on one part and a track follower on the other part and adapted to run along said track during relative vertical movement of the parts so as to oppose the aforesaid movement of the implement part about its front pivot.

27. The invention defined in claim 26, in which: the stop on one part is included in the track follower; and the stop on the other part is one end of the track.

28. The invention defined in claim 27, in which: the shape of the track is such that the force exerted by downward movement of the implement part about the front pivot has a component effective to move the supporting part and draft link downwardly relative to said implement part so as to separate the stops.

29. The invention defined in claim 28, in which: the shape of the track is arcuate about a center rearwardly and downwardly eccentric to the draft link pivot.

References Cited in the file of this patent

UNITED STATES PATENTS 2,669,825     Preble et al. _____ Feb. 23, 1954